United States Patent
Matsuda et al.

(10) Patent No.: US 7,820,607 B2
(45) Date of Patent: Oct. 26, 2010

(54) VISCOSITY MODIFIER FOR LUBRICATING OILS, ADDITIVE COMPOSITION FOR LUBRICATING OILS, AND LUBRICATING OIL COMPOSITIONS

(75) Inventors: Akihiro Matsuda, Ichihara (JP); Ryousuke Kaneshige, Kisarazu (JP); Satoshi Ikeda, Ichihara (JP); Keiji Okada, Ichihara (JP)

(73) Assignees: Mitsui Chemicals, Inc., Tokyo (JP); The Lubrizol Corporation, Wickliffe, OH (US)

( * ) Notice: Subject to any disclaimer, the term of this patent is extended or adjusted under 35 U.S.C. 154(b) by 195 days.

(21) Appl. No.: 11/662,139

(22) PCT Filed: Sep. 8, 2005

(86) PCT No.: PCT/JP2005/016512

§ 371 (c)(1), (2), (4) Date: Mar. 8, 2007

(87) PCT Pub. No.: WO2006/028169

PCT Pub. Date: Mar. 16, 2006

(65) Prior Publication Data
US 2007/0249508 A1 Oct. 25, 2007

(30) Foreign Application Priority Data
Sep. 10, 2004 (JP) .............................. 2004-263953

(51) Int. Cl.
C10M 143/00 (2006.01)
(52) U.S. Cl. ......................................... 508/591; 585/12
(58) Field of Classification Search ................ 508/591; 585/12, 520, 523, 113; 526/348; 525/314, 525/246, 249
See application file for complete search history.

(56) References Cited

U.S. PATENT DOCUMENTS

| | | | |
|---|---|---|---|
| 3,551,336 A | 12/1970 | Jacobsson et al. | |
| 3,697,429 A | 10/1972 | Engel et al. | |
| 4,388,202 A | 6/1983 | Nagano et al. | |
| 4,507,515 A | 3/1985 | Johnston et al. | |
| 6,764,985 B2 | 7/2004 | Okada et al. | |
| 2003/0087772 A1 | 5/2003 | Okada et al. | |
| 2004/0058830 A1* | 3/2004 | Kan et al. | 508/591 |

FOREIGN PATENT DOCUMENTS

| | | | |
|---|---|---|---|
| EP | 1148115 A1 | | 10/2001 |
| EP | 1178102 A1 | | 2/2002 |
| EP | 1300458 A1 | * | 4/2003 |
| EP | 1300458 A1 | | 4/2003 |
| EP | 1441023 A1 | | 7/2004 |
| JP | 60-228600 A | | 11/1985 |
| JP | 9-316147 A | | 12/1997 |
| JP | 2004-315830 A | | 11/2004 |
| WO | WO-01/85880 A1 | | 11/2001 |
| WO | WO-03/038017 A1 | | 5/2003 |
| WO | WO-2004/031250 A1 | | 4/2004 |

OTHER PUBLICATIONS

European Search Report for Application No. 05782285.0 dated Apr. 29, 2010.

* cited by examiner

*Primary Examiner*—Ellen M McAvoy
*Assistant Examiner*—Pamela Weiss
(74) *Attorney, Agent, or Firm*—Birch, Stewart, Kolasch & Birch, LLP

(57) ABSTRACT

A viscosity modifier for lubricating oils or an additive composition for lubricating oils, which is excellent in oil-thickening properties and can provide lubricating oil compositions excellent in low-temperature characteristics and handleability at low temperatures; and lubricating oil compositions excellent in low-temperature characteristics and handleability at low temperatures. The viscosity modifier comprises an ethylene/α-olefin copolymer (B) which comprises (i) a structural unit derived from ethylene, (ii) a structural unit derived from an α-olefin having 3 to 19 carbon atoms, and (iii) a structural unit derived from a higher α-olefin having 4 to 20 carbon atoms whose carbon number is by one or more larger than that of the α-olefin having the unit (ii) which has the following properties of (1) and (2): (1) the contents of units (i), (ii) and (iii) are 25-49 mol %, 15-55 mol %, and 9-40 mol % respectively (with the proviso that the total of the units (i), (ii), and (iii) is 100 mol %) and (2) the intrinsic viscosity [η] is 0.5 to 5.0 dl/g.

5 Claims, No Drawings

VISCOSITY MODIFIER FOR LUBRICATING OILS, ADDITIVE COMPOSITION FOR LUBRICATING OILS, AND LUBRICATING OIL COMPOSITIONS

TECHNICAL FIELD

The present invention relates to a viscosity modifier for lubricating oils, an additive composition for lubricating oils, and lubricating oil compositions. More specifically, the present invention relates to a viscosity modifier for lubricating oils or an additive composition for lubricating oils which is excellent in oil-thickening properties and can provide lubricating oil compositions excellent in low-temperature properties and handleability at low temperatures; and lubricating oil compositions excellent in low-temperature characteristics and handleability at low temperatures.

BACKGROUND ART

Petroleum products generally exhibit a large variation in viscosity with variation in temperature. For lubricating oils used for automobiles or the like, it is preferable that such a temperature dependence of viscosity is small. In order to decrease the temperature dependence of viscosity, an ethylene/α-olefin copolymer having an effect of improving viscosity index is widely used as an ingredient blended in lubricating oils.

Further, lubricating oils lose fluidity at low temperatures because wax components therein solidify to crystals. In order to lower the solidifying temperature, lubricating oils also contain a pour-point depressant. The pour-point depressant prevents a three-dimensional network structure from forming through crystallization of wax components in lubricating oils, lowering the pour point of the lubricating oils.

Among low-temperature characteristics of lubricating oils which contain an ethylene/α-olefin copolymer and a pour-point depressant, the viscosity at a high shear rate is determined by compatibility between a lubricating oil base and the ethylene/α-olefin copolymer, while the viscosity at a low shear rate is strongly affected by the pour-point depressant. It is known that when an ethylene/α-olefin copolymer having a specific composition is used, the effect of a pour-point depressant is remarkably lowered through interaction of the copolymer with the pour-point depressant (refer to Patent document 1 and Patent document 2).

For this reason, an ethylene/α-olefin copolymer blended in lubricating oils, especially lubricating oils which are requested to have excellent low-temperature properties, is required not to impair the function of a pour-point depressant as well as to possess excellent performance of improving viscosity index.

In order to avoid the interaction between a pour-point depressant and an ethylene/α-olefin copolymer, it has been proposed to use, as a viscosity index improver, an ethylene/α-olefin copolymer having ununiform composition distribution, which is obtained by using a specific polymerization apparatus under specific polymerization conditions (refer to Patent document 3). However, no lubricating oils excellent in low-temperature characteristics at any shear rate were obtained.

As a method for improving low-temperature characteristics of lubricating oils, there is also mentioned a method where an ethylene/propylene copolymer having a high ethylene content is added as a viscosity index improver. In this method, low-temperature characteristics were improved with increasing ethylene content, but in some cases the ethylene sequence in the viscosity index improver crystallized at low temperatures, lubricating oil compositions themselves jellified, lowering handleability.

Further, even in a case where a copolymer having a high ethylene content was suitably used as a viscosity modifier for lubricating oils, the composition sometimes jellified at low temperatures when the molecular weight was over a given range or the ethylene copolymer had a wider composition distribution even a little or the like Thus, property tolerance of the employed copolymer can not be so wide, and the properties need to be strictly controlled.

In the above circumstances, the present inventors have intensively investigated and found that a specific copolymer which comprises a structural unit derived from ethylene, a structural unit derived from an α-olefin having 3 to 19 carbon atoms, and a structural unit derived from an α-olefin having 4 to 20 carbon atoms does not impair the function of a pour-point depressant due to the above-mentioned interaction and that the amount of copolymer blended can be reduced because a high molecular weight copolymer can be prepared. That is, the copolymer works as a viscosity modifier for lubricating oils which is excellent in oil-thickening ability. Further, this copolymer has suitably adjusted compatibility with a lubricating oil base at low temperatures, providing lubricating oil compositions excellent in low-temperature characteristics in entire range of shear rate and excellent in handleability at low temperatures. Based on this finding, the present invention has been accomplished.

Patent document 1: U.S. Pat. No. 3,697,429;

Patent document 2: U.S. Pat. No. 3,551,336;

Patent document 3: Japanese Patent Laid-Open Publication No. 228600/1985.

DISCLOSURE OF THE INVENTION

Problems to be Solved by the Invention

It is an object of the present invention to provide a viscosity modifier for lubricating oils or an additive composition for lubricating oils, which is excellent in oil-thickening ability and can provide lubricating oil compositions excellent in low-temperature characteristics and handleability at low temperatures; and lubricating oil compositions excellent in low-temperature characteristics and handleability at low temperatures.

Means for Solving the Problems

A viscosity modifier for lubricating oils according to the present invention comprises an ethylene/α-olefin copolymer (B) which comprises (i) a structural unit derived from ethylene;

(ii) a structural unit derived from an α-olefin having 3 to 19 carbon atoms; and (iii) a structural unit derived from a higher α-olefin having 4 to 20 carbon atoms whose carbon number is by one or more larger than that of the structural unit derived from an α-olefin having 3 to 19 carbon atoms, and has the following properties of (1) and (2):

(1) it contains 25 to 49 mol % of the structural unit (i) derived from ethylene, 15 to 55 mol % of the structural unit (ii) derived from an α-olefin having 3 to 19 carbon atoms, and 9 to 40 mol % of the structural unit (iii) derived from a higher α-olefin having 4 to 20 carbon atoms, wherein the total molar amount of the structural units of (i), (ii), and (iii) is 100 mol %;

(2) the intrinsic viscosity ([η]) is in the range of 0.5 to 5.0 dl/g as measured in decalin at 135° C.

In the present invention, it is preferable that the ethylene/α-olefin copolymer (B) has at least one of the following properties of (3) to (5):

(3) Mw/Mn (Mw: weight average molecular weight, Mn: number average molecular weight) is 2.4 or less;

(4) heat of fusion as measured by DSC is 5.0 J/g or less;

(5) intensity ratio D is 0.5 or less, where D is the ratio of Sαβ to Sαα (Sαβ/Sαα) as measured by $^{13}$C-NMR.

An additive composition for lubricating oils according to the present invention comprises (A) oil, and (B) the above-mentioned ethylene/α-olefin copolymer, containing 1 to 30% by weight of the ethylene/α-olefin copolymer (B), wherein the total weight of (A) and (B) is 100% by weight.

A lubricating oil composition according to the present invention comprises (AA) a lubricating oil base, (B) the above-mentioned ethylene/α-olefin copolymer, and (C) a pour-point depressant, containing 0.1 to 5% by weight of the ethylene/α-olefin copolymer (B) and 0.05 to 5% by weight of the pour-point depressant (C), wherein the weight of the lubricating oil composition is 100% by weight.

EFFECT OF THE INVENTION

A viscosity modifier for lubricating oils or an additive composition for lubricating oils according to the present invention is excellent in oil-thickening properties and can provide lubricating oil compositions excellent in low-temperature characteristics and handleability at low temperatures.

Lubricating oil compositions according to the present invention are excellent in low-temperature characteristics, and exhibit excellent handleability without jellifying themselves at low temperatures.

BEST MODE FOR CARRYING OUT THE INVENTION

The viscosity modifier for lubricating oils and lubricating oil compositions according to the present invention are specifically described below.

[Viscosity Modifier for Lubricating Oils]

The viscosity modifier for lubricating oils according to the present invention comprises an ethylene/α-olefin copolymer (B) (hereinafter, may be simply called "copolymer (B)") which comprises (i) a structural unit derived from ethylene (hereinafter, may be called "structural unit (i)"), (ii) a structural unit derived from an α-olefin having 3 to 19 carbon atoms (hereinafter, may be called "structural unit (ii)"), and (iii) a structural unit derived from a higher α-olefin having 4 to 20 carbon atoms whose carbon number is by one or more larger than that of the above-mentioned structural unit derived from an α-olefin having 3 to 19 carbon atoms (hereinafter, may be called "structural unit (iii)"), wherein the copolymer (B) has properties described below.

As the structural unit (ii), specifically, there may be mentioned a structural unit derived from propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, 1-eicocene or the like. Of these, the structural unit (ii) is preferably a structural unit derived from an α-olefin having 3 to 9 carbon atoms, more preferably a structural unit derived from an α-olefin having 3 to 7 carbon atoms, still more preferably a structural unit derived from propylene. When the copolymer (B) containing structural unit (ii) derived from propylene is blended with lubricating oils, lubricating oil compositions particularly excellent in low-temperature characteristics can be prepared over a wide range of ethylene content.

As the structural unit (iii), there may be specifically mentioned 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, 1-eicocene or the like. Of these, a structural unit derived from an α-olefin having 4 to 10 carbon atoms is preferable in the present invention, a structural unit derived from an α-olefin having 4 to 8 carbon atoms is more preferable, and a structural unit derived from 1-butene, 1-hexene, or 1-octene is particularly preferable. With any of these carbon atom numbers, lubricating oil compositions excellent in low-temperature characteristics can be prepared over a wide range of ethylene content.

Within a range where the objects of the present invention are not impaired, another monomer, that is, a monomer other than α-olefins having 2 to 20 carbon atoms, is optionally copolymerized up to about 10 mol % with respect to 100 mol %, as the total, of the structural units of (i), (ii), and (iii). However, it is preferred that any polyene compound is not contained as a copolymer component. When the copolymer (B) does not contain polyene compound as a copolymer component, the copolymer (B) is excellent in heat resistance, particularly it is hardly oxidized or colored, and further particularly excellent in lubrication property when it is blended with lubricating oils.

The copolymer (B) has the following properties of (1) and (2):

(1) The copolymer (B) comprises 25 to 49 mol % of the structural unit (i) (repeating unit derived from ethylene), 15 to 55 mol % of the structural unit (ii) (repeating unit derived from an α-olefin having 3 to 19 carbon atoms), and 9 to 40 mol % of the structural unit (iii) (repeating unit derived from a higher α-olefin having 4 to 20 carbon atoms whose carbon number is by one or more larger than that of the repeating unit derived from an α-olefin having 3 to 19 carbon atoms), wherein the total molar amount of the structural units (i), (ii), and (iii) is 100 mol %.

Structural Unit (i)

The copolymer (B) comprises the structural unit (i) in a content of 25 to 49 mol %, preferably 29 to 49 mol %, more preferably 35 to 49 mol %, still more preferably 40 to 49 mol %. Within this range of the content of the structural unit (i), lubricating oil compositions particularly excellent in low-temperature characteristics, such as viscosity at low temperatures, can be prepared when the copolymer (B) is blended with lubricating oils.

Structural Unit (ii)

The copolymer (B) comprises the structural unit (ii) in a content of 15 to 55 mol %, preferably 18 to 42 mol %, more preferably 20% to 40 mol %. Within this range of the content of the structural unit (ii), lubricating oil compositions particularly excellent in low-temperature characteristics can be prepared when the copolymer (B) is blended with lubricating oils.

Structural Unit (iii)

The copolymer (B) comprises the structural unit (iii) in a content of 9 to 40 mol %, preferably 10 to 38 mol %, more preferably 10 to 35 mol %.

When the copolymer (B) used in the present invention, which comprises the structural unit (i), the structural unit (ii), and the structural unit (iii), has the above-described compositions, one can obtain lubricating oil compositions having satisfactory low-temperature characteristics and excellent handleability at low temperatures.

The lubricating oil composition using copolymer (B) provides good low temperature characteristics. That is, the copolymer (B) has a wider range of ethylene content than that of a binary copolymer made from ethylene and an α-olefin having three or more carbon atoms. This can be confirmed as follows: the relationship between the content of the structural unit derived from ethylene and the MR viscosity and the relationship between the content of a structural unit derived from ethylene and storage stability at low temperatures are graphically represented for the copolymer (B) which can be used in the present invention; from these graphs, the range (or content) of the structural unit derived from ethylene in which acceptable MR viscosity and storage stability at low temperatures can be attained is determined; and this range (or content) is compared with the acceptable range of the structural unit derived from ethylene obtained when the copolymer (B) is replaced with a binary copolymer made from ethylene and an α-olefin having three or more carbon atoms.

The composition of the copolymer (B) can be determined by $^{13}$C-NMR in accordance with the method described in "Handbook of Polymer Analysis" (edited by the Japan Society for Analytical Chemistry, Polymer analysis study group, published by Kinokuniya Company Ltd.).

(2) The intrinsic viscosity ([η]) of the copolymer (B) as measured in decalin at 135° C. is in the range of 0.5 to 5.0 dl/g. When the intrinsic viscosity ([η]) is within this range, the oil-thickening properties are excellent, whereby the amount of the copolymer (B) required for obtaining a specific viscosity of lubricating oils is reduced. As a result, one can obtain lubricating oil compositions which hardly jellify at low temperatures and are excellent in shear stability. The oil-thickening properties are evaluated as described in examples. That is, when the amount of the copolymer to be added to lubricating oil compositions for attaining a given predetermined dynamic viscosity of the lubricating oil compositions at 100° C. is smaller, the oil-thickening property is evaluated to be better.

When the intrinsic viscosity ([η]) is in the range of 0.5 to 4.0 dl/g, preferably 1.0 to 3.0 dl/g, more preferably 1.5 to 2.5 dl/g, the copolymer (B) can particularly improve the viscosity index of lubricating oils.

The copolymer (B) preferably has at least one of the following properties of (3) to (5).

(3) The copolymer (B) has an Mw/Mn (Mw: weight average molecular weight, Mn: number average molecular weight) of preferably 2.4 or less, more preferably 2.2 or less. The Mw/Mn is an index representing molecular weight distribution. The molecular weight distribution is preferred to be 2.4 or less, because viscosity of the lubricating oil exhibits good shear stability.

The copolymer (B) having an Mw/Mn within the above range can be produced by using a metallocene-based catalyst described later.

(4) The copolymer (B) has a heat of fusion (ΔH) of preferably 5.0 J/g or less as measured by a differential scanning calorimeter (DSC), more preferably from 0 to 5.0 J/g, still more preferably from 0 to 4.0 J/g, particularly preferably from 0 to 3.0 J/g. The heat of fusion is preferred to be within this range, because jellification hardly occurs at low temperatures in this case.

The heat of fusion was determined from the area of endothermic peaks of an endothermic curve recorded with a differential scanning calorimeter (DSC). That is, a sample was packed in an aluminum pan, heated to 200° C. at a rate of 10° C./min, kept at 200° C. for 5 min, cooled to minus 150° C. at a rate of 20° C./min, and heated again at a rate of 10° C./min, and the endothermic curve in the second run was used for determination.

The copolymer (B) having a heat of fusion (ΔH) in the above range can be produced using a metallocene-based catalyst described later. The heat of fusion (ΔH) can be changed within the above range by changing the content of the structural unit derived from ethylene or the contents of the structural units derived from α-olefins.

The copolymer (B) used in the present invention is preferably a copolymer obtained by copolymerizing, with a catalyst containing a metallocene compound and an ionized ionic compound, which is described later, (i) ethylene, (ii) an α-olefin having 3 to 19 carbon atoms, and (iii) a higher α-olefin having 4 to 20 carbon atoms whose carbon number is by one or more larger than that of the α-olefin (ii) having 3 to 19 carbon atoms, in view of low-temperature characteristics of lubricating oil compositions.

(5) The copolymer (B) has an intensity ratio D of preferably 0.5 or less, more preferably 0.3 or less, wherein D is the intensity ratio of Sαβ to Sαα (Sαβ/Sαα) as obtained from a $^{13}$C-NMR spectrum.

When the copolymer (B) having an intensity ratio D (Sαβ/Sαα) of 0.5 or less is contained, fluidity of lubricating oils at low temperatures can be improved and lubricating characteristics at high temperatures can be also improved. Further, balancing between these two properties, that is, between fluidity at low temperatures and lubricating characteristics at high temperatures, is particularly excellent.

The Sαβ and Sαα which are obtained from a $^{13}$C-NMR spectrum are the peak intensities corresponding to $CH_2$ groups in the structural units derived from ethylene and an α-olefin having 3 to 20 carbon atoms respectively. They are two types of $CH_2$ groups in the positions represented below.

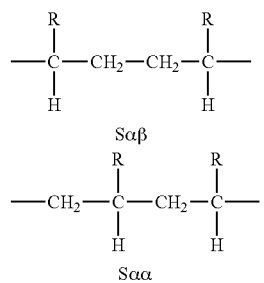

(In the formulae, R independently represents a hydrogen atom or an alkyl group having 1 to 6 carbon atoms.)

The measured $^{13}$C-NMR spectrum is analyzed in accordance with the method described by J. C. Randall (Review Macromolecular Chemistry Physics, C29, 201(1989)), and the Sαβ and Sαα are determined.

The intensity ratio D is calculated from the ratio of integrated values (areas) for each of the peaks. The intensity ratio D thus obtained is generally considered to be a criterion representing the ratio at which 1,2-addition of an α-olefin is followed by 2,1-addition or the ratio at which 2,1-addition of an α-olefin is followed by 1,2-addition. Therefore, a larger value of this intensity ratio D shows more irregular bonding orientation of the α-olefin. To the contrary, a smaller value of D shows more regular bonding orientation of the α-olefin.

The copolymer (B) with such properties exhibits a large effect of improving viscosity index when it is blended with a lubricating oil base and does not impair the function of a pour-point depressant.

The copolymer (B) having an intensity ratio D within the above range can be produced by using a metallocene-based catalyst described later. By modifying the molecular structure of the metallocene-based catalyst, the intensity ratio D can be changed within the range described above. The intensity ratio D can be also changed by changing the polymerization temperature.

By using the copolymer (B) as a viscosity modifier, there can be provided lubricating oils capable of satisfying the standard for low-temperature characteristics specified by GF-4 standard, which is the next-generation North American standard for lubricating oils. Whether lubricating oils satisfy GF-4 standard or not can be judged by measuring the CCS viscosity and the MR viscosity as described later.

The copolymer (B) used as a viscosity modifier for lubricating oils in the present invention can be obtained by copolymerizing ethylene, an α-olefin having 3 to 19 carbon atoms, a higher α-olefin having 4 to 20 carbon atoms whose carbon number is by one or more larger than that the α-olefin having 3 to 19 carbon atoms (hereinafter, simply called "higher α-olefin having 4 to 20 carbon atoms") and, if necessary, another monomer in the presence of an olefin polymerization catalyst.

As such olefin polymerization catalyst, there may be used a catalyst composed of a compound of transition metal such as zirconium, hafnium, titanium and the like and an organoaluminum compound (organoaluminum oxy-compound) and/or an ionized ionic compound. Of these, a catalyst particularly suitably used in the present invention is a metallocene-based catalyst which composed of a metallocene compound of transition metal selected from Group 4 of the Periodic Table or the like and an organoaluminum oxy-compound and/or an ionized ionic compound.

In the following, the metallocene-based catalyst will be described.

As a metallocene compound composed of transition metal selected from Group 4 of the Periodic Table which forms the metallocene-based catalyst, there may be mentioned a metallocene compound described from line 5 at page 16 to line 4 at page 19 in the pamphlet of WO01/85880, which is specifically represented by the following general formula (a):

$$ML_x \tag{a}$$

In formula (a), M is transition metal selected from Group 4 of the Periodic Table, specifically zirconium, titanium, or hafnium;

x is valency of the transition metal; and

L is a ligand coordinating to the transition metal. At least one of these ligands L is a ligand having a cyclopentadienyl skeleton, and the ligand having a cyclopentadienyl skeleton optionally has a substituent.

As the ligand having a cyclopentadienyl skeleton, there may be mentioned, for example, a cyclopentadienyl group, an alkyl- or cycloalkyl-substituted cyclopentadienyl group, an indenyl group, a 4,5,6,7-tetrahydroindenyl group, and a fluorenyl group. These groups are optionally substituted with a halogen atom, a trialkylsilyl group or the like.

When the compound represented by general formula (a) has two or more groups having a cyclopentadienyl skeleton as ligand L, among these groups, two groups having a cyclopentadienyl skeleton may be bonded to each other through a (substituted) alkylene group, a (substituted) silylene group or the like.

As a ligand L other than the ligand having a cyclopentadienyl skeleton, there may be mentioned a hydrocarbon group having 1 to 12 carbon atoms, an alkoxy group, an aryloxy group, a sulfonic acid containing group ($—SO_3R^a$, wherein $R^a$ is an alkyl group, a halogenated alkyl group, an aryl group, or an aryl group substituted with a halogen atom or an alkyl group), a halogen atom, a hydrogen atom and the like.

Examples of metallocene compounds which contain zirconium as M and have at least two ligands having a cyclopentadienyl skeleton are listed below:

bis(methylcyclopentadienyl)zirconium dichloride,
bis(ethylcyclopentadienyl)zirconium dichloride,
bis(n-propylcyclopentadienyl)zirconium dichloride,
bis(indenyl)zirconium dichloride,
bis(4,5,6,7-tetrahydroindenyl)zirconium dichloride and the like.

Further, there may be also mentioned compounds wherein zirconium metal in the above compounds is replaced with titanium metal or hafnium metal.

In the present invention, as the metallocene compound, there may be used a compound represented by the following general formula (b):

$$L^1M^1X_2 \tag{b}$$

(In the formula, $M^1$ is a metal of Group 4 or of the lanthanide series of the Periodic Table;

$L^1$ is a derivative of a delocalized π-bonding group, providing the active metal site of $M^1$ with a constraint geometry; and X each independently is a hydrogen atom, a halogen atom, or a hydrocarbon, silyl, or germyl group containing 20 or less carbon, silicon or germanium atoms.)

Among the compounds represented by general formula (b), a preferred compound is represented by the following general formula (c):

In the formula, $M^1$ is titanium, zirconium, or hafnium;

X is the same as described above;

Cp is a substituted cyclopentadienyl group having a substituent Z which bonds to $M^1$ through π-bond;

Z is oxygen, sulfur, boron, or an element of Group 14 of the Periodic Table (for example, silicon, germanium, or tin);

Y is a ligand containing nitrogen, phosphorus, oxygen, or sulfur; and

Z and Y may form a condensed ring.

As the compound represented by general formula (c), there may be mentioned, specifically,

[dimethyl(t-butylamido)(tetramethyl-η⁵-cyclopentadienyl) silane]titanium dichloride,
[(t-butylamido)(tetramethyl-η⁵-cyclopentadienyl)-1,2-ethanediyl]titanium dichloride,
[dibenzyl(t-butylamido)(tetramethyl-η⁵-cyclopentadienyl) silane]titanium dichloride,
[dimethyl(t-butylamido)(tetramethyl-η⁵-cyclopentadienyl) silane]dibenzyltitanium,
[dimethyl(t-butylamido)(tetramethyl-η⁵-cyclopentadienyl) silane]dimethyltitanium,
[(t-butylamido)(tetramethyl-η⁵-cyclopentadienyl)-1,2-ethanediyl]dibenzyltitanium,
[(methylamido)(tetramethyl-η⁵-cyclopentadienyl)-1,2-ethanediyl]dineopentyltitanium,
[(phenylphosphido)(tetramethyl-η⁵-cyclopentadienyl) methylene]diphenyltitanium,
[dibenzyl(t-butylamido)(tetramethyl-η⁵-cyclopentadienyl) silane]dibenzyltitanium,
[dimethyl(benzylamido)(η⁵-cyclopentadienyl) silane]di(trimethylsilyl)titanium,
[dimethyl(phenylphosphido)(tetramethyl-η⁵-cyclopentadienyl)silane]dibenzyltitanium,
[(tetramethyl-η⁵-cyclopentadienyl)-1,2-ethanediyl]dibenzyltitanium,
[2-η⁵-(tetramethylcyclopentadienyl)-1-methylethanolato (2-)]dibenzyltitanium,
[2-η⁵-(tetramethylcyclopentadienyl)-1-methylethanolato (2-)]dimethyltitanium,
[2-((4a,4b,8a,9,9a-η)-9H-fluoren-9-yl)cyclohexanolato(2-)] dimethyltitanium,
[2-((4a,4b,8a,9,9a-η)-9H-fluoren-9-yl)cyclohexanolato(2-)] dibenzyltitanium and the like.

Further, there may be also mentioned compounds wherein the titanium metal in the above-described compounds is replaced with zirconium metal or hafnium metal.

These metallocene compounds may be used solely or in combination of two or more kinds thereof.

In the present invention, as the metallocene compound represented by the general formula (a), a zirconocene compound which contains zirconium as a central metal atom and at least two ligands having a cyclopentadienyl skeleton is preferably used. The metallocene compound represented by the general formula (b) or (c) preferably contains titanium as the central metal atom. Among the above-described metallocene compounds, a particularly preferred one is a compound represented by general formula (c) containing titanium as the central metal atom.

An organoaluminum oxy-compound which forms the metallocene-based catalyst may be a publicly known aluminoxane as described from line 24 at page 21 to line 6 from the bottom at page 22 in the pamphlet of WO01/85880. It may be an organoaluminum oxy-compound which is insoluble in benzene.

As an ionized ionic compound which forms the metallocene-based catalyst, there may be mentioned a Lewis acid, an ionic compound and the like.

As the Lewis acid, there may be mentioned a compound represented by BR₃, wherein R is a phenyl group optionally substituted with a fluorine atom, a methyl group, a trifluoromethyl group or the like; or a fluorine atom.

As the ionic compound, there may be mentioned trialkylated ammonium salt, N,N-dialkylanilinium salt, dialkylammonium salt, triarylphosphonium salt and the like.

These Lewis acids and ionic compounds are publicly known as exemplified, for example, from line 1 to line 6 at page 23, and from line 10 at page 23 to line 7 at page 24, respectively, in the pamphlet of WO01/85880.

Further, as the ionic compound, there may be also mentioned triphenylcarbenium tetrakis(pentafluorophenyl)borate, N,N-dimethylanilinium tetrakis(pentafluorophenyl)borate, ferrocenium tetra(pentafluorophenyl)borate and the like. In particular, an ionized ionic compound is suitably used, for regulating the composition distribution of the ethylene/α-olefin copolymer (B).

For forming the metallocene-based catalyst, an organoaluminum compound may be used in combination with an organoaluminum oxy-compound and/or an ionized ionic compound. As the organoaluminum compound, there may be mentioned a compound represented by the following general formula (f):

In the formula, R¹ represents a hydrocarbon group having 1 to 15 carbon atoms, preferably 1 to 4 carbon atoms; X represents a halogen atom or a hydrogen atom; and n is a number of 1 to 3.

Such organoaluminum compound is publicly known as exemplified, for example, from line 23 at page 24 to line 5 at page 26 in the pamphlet of WO01/85880.

In the presence of the above-mentioned metallocene-based catalyst, ethylene, an α-olefin having 3 to 19 carbon atoms, a higher α-olefin having 4 to 20 carbon atoms, and, if necessary, another monomer are copolymerized generally in a liquid phase. As a polymerization solvent, a hydrocarbon solvent is generally used but an α-olefin such as propylene may be used.

As the hydrocarbon solvent used in polymerization, there may be used aliphatic hydrocarbons such as pentane, hexane, heptane, octane, decane, dodecane, and kerosene and halogenated derivatives thereof; alicyclic hydrocarbons such as cyclohexane, methylcyclopentane, and methylcyclohexane and halogenated derivatives thereof; and aromatic hydrocarbons such as benzene, toluene and xylene, and halogenated derivatives thereof such as chlorobenzene. These solvents may be used solely or in combination of two or more kinds thereof.

Ethylene, an α-olefin having 3 to 19 carbon atoms, a higher α-olefin having 4 to 20 carbon atoms, and, if necessary, another monomer may be copolymerized either by batch method or by continuous process, but continuous copolymerization is preferred. Continuous copolymerization using a stirred tank reactor is particularly preferred. In continuous copolymerization, the metallocene-based catalyst is used, for example, at the following concentration.

The concentration of metallocene compound in a polymerization system is generally 0.00005 to 0.1 mmol/L (polymerization volume), preferably 0.0001 to 0.05 mmol/L. The organoaluminum oxy-compound is supplied in such an amount that the molar ratio of aluminum atom to transition metal of the metallocene compound in the polymerization system (Al/transition metal) becomes 1 to 10000, preferably 10 to 5000.

The ionized ionic compound is supplied in such an amount that the molar ratio of the ionized ionic compound to the metallocene compound in the polymerization system (ionized ionic compound/metallocene compound) becomes 0.5 to 30, preferably 1 to 25.

When an organoaluminum compound is used, the concentration thereof is generally about 0 to 5 mmol/L (polymerization volume), preferably about 0 to 2 mmol/L.

In the case of copolymerizing ethylene, an α-olefin having 3 to 19 carbon atoms, a higher α-olefin having 4 to 8 carbon atoms, and, if necessary, another monomer in the presence of the above-mentioned metallocene-based catalyst, copolymerization is carried out under conditions wherein the temperature is generally from minus 20° C. to 150° C., preferably from 0° C. to 120° C., more preferably from 0° C. to 100° C., and the pressure is over 0 and 80 kg/cm² or below, preferably over 0 and 50 kg/cm² or below. The above-mentioned polymerization conditions are preferably kept constant in continuous polymerization.

The reaction time (average retention time in the case of continuous copolymerization), which depends on conditions such as catalyst concentration, and polymerization temperature, is generally 5 min to 5 hr, preferably 10 min to 3 hr.

Ethylene, an α-olefin having 3 to 19 carbon atoms, a higher α-olefin having 4 to 20 carbon atoms, and, if necessary, another monomer are supplied to the polymerization system in such amounts that the copolymer (B) having the above-described specific composition can be obtained. In addition, a molecular weight modifier such as hydrogen may be used in copolymerization.

When ethylene, an α-olefin having 3 to 19 carbon atoms, a higher α-olefin having 4 to 20 carbon atoms, and, if necessary, another monomer are copolymerized as described above, the copolymer (B) is obtained as a polymerization solution containing the copolymer. The polymerization solution is treated in a usual manner, providing the copolymer (B) used in the present invention.

[Additive Composition for Lubricating Oils]

An additive composition for lubricating oils according to the present invention is a composition which contains oil (A) and the copolymer (B).

At first, each component composing the additive composition for lubricating oils according to the present invention is explained.

<(A) Oil>

Oil (A) used in the present invention includes mineral oils and synthetic oils such as poly-α-olefin, polyol ester, diesters such as dioctyl phthalate and dioctyl sebacate, and polyalkylene glycol. Mineral oils or blends of mineral oils and synthetic oils are preferably used. Mineral oils subjected to a purification step such as dewaxing or the like are generally used, and have several grades designated in accordance with purification procedures. Generally a mineral oil having a wax content of 0.5 to 10% is used. One may also use a highly purified oil which is produced, for example, by hydrocracking purification and has a low pour point, a high viscosity index, and a composition mainly composed of isopraffin. Generally, the oil having a kinematic viscosity at 40° C. of 10 to 200 cSt is used.

As described above, mineral oils are used generally after a purification step such as dewaxing and are classified into several grades which are defined by API (American Petroleum Institute) classification. The properties of lubricating oil bases which are classified into each of the groups are shown in Table 1.

TABLE 1

| Group | Kind | Viscosity index *1 | Saturated hydrocarbon content *2 (% by volume) | Sulfur content *3 (% by weight) |
|---|---|---|---|---|
| (i) *4 | mineral oil | 80 to 120 | <90 | >0.03 |
| (ii) | mineral oil | 80 to 120 | ≧90 | ≦0.03 |

TABLE 1-continued

| Group | Kind | Viscosity index *1 | Saturated hydrocarbon content *2 (% by volume) | Sulfur content *3 (% by weight) |
|---|---|---|---|---|
| (iii) | mineral oil | ≧120 | ≧90 | ≦0.03 |
| (iv) | poly-α-olefin | | | |
| (v) | lubricating oil base other than the above | | | |

*1: Measured in accordance with ASTM D445 (JIS K2283)
*2: Measured in accordance with ASTM D3238
*3: Measured in accordance with ASTM D4294 (JIS K2541)
*4: Group (i) includes mineral oils having a saturated hydrocarbon content of less than 90% by volume and a sulfur content of less than 0.03% by weight; mineral oils having a saturated hydrocarbon content of not less than 90% by volume and a sulfur content of more than 0.03% by volume; and mineraloils having a saturated hydrocarbon content of less than 90% by volume and a sulfur content of more than 0.03% by weight.

Poly-α-olefin in Table 1 is a hydrocarbon polymer which is obtained by polymerizing at least an α-olefin having 10 or more carbon atoms as a raw material monomer, and polydecene obtained by polymerizing 1-decene is exemplified.

The oil (A) used in the present invention is preferably the oil belonging to any of groups (i) to (iv). Particularly preferable oil is a mineral oil having a kinematic viscosity at 100° C. of 1 to 50 mm²/s and a viscosity index of 80 or more, or poly-α-olefin. Further, mineral oils belonging to group (ii) or group (iii) or poly-α-olefin belonging to group (iv) are preferred as the oil (A). Oils belonging to group (ii) or group (iii) tend to have a lower wax content as compared with oils belonging to group (i). Particularly, the most preferable oil is a mineral oil which belongs to group (ii) or group (iii) and has a kinematic viscosity at 100° C. of 1 to 50 mm²/s and a viscosity index of 80 or more, or poly-α-olefin belonging to group (iv).

<(B) Copolymer>

As copolymer (B) used in the present invention, the above-described copolymer (B) which is a viscosity modifier for lubricating oils is used.

That is, there is used the copolymer (B) which comprises (i) a structural unit derived from ethylene, (ii) a structural unit derived from an α-olefin having 3 to 19 carbon atoms, and (iii) a structural unit derived from a higher α-olefin having 4 to 20 carbon atoms whose carbon number is by one or more larger than that of the structural unit derived from an α-olefin having 3 to 19 carbon atoms, and has the following properties of (1) and (2):

(1) it contains 25 to 49 mol % of the structural unit (i), 15 to 55 mol % of the structural unit (ii), and 9 to 40 mol % of the structural unit (iii) (the total molar amount is 100 mol %);

(2) the intrinsic viscosity ([η]) is 0.5 to 5.0 as measured in decalin at 135° C.

The structural unit (ii) composing the copolymer (B) is preferably propylene. The structural unit (iii) composing the copolymer (B) is preferably 1-butene, 1-hexene, or 1-octene.

A copolymer that is particularly preferred as the copolymer (B) comprising 29 to 49 mol % of the structural unit (i), 20 to 40 mol % of the structural unit (ii), and 10 to 35 mol % of the structural unit (iii), as described above.

It is preferred that the copolymer (B) has at least one of the following properties of (3) to (5):

(3) Mw/Mn is 2.4 or less;

(4) heat of fusion (ΔH) as measured by DSC is 5.0 J/g or less;

(5) intensity ratio D is 0.5 or less, where D is the ratio of Sαβ to Sαα (Sαβ/Sαα) as measured by $^{13}$C-NMR.

An additive composition for lubricating oils according to the present invention comprises the copolymer (B) and oil (A). The content of (B) is from 1 to 30% by weight and that of oil (A) is from 99% by weight to 70% by weight, wherein the total amount of (A) and (B) is 100% by weight. Preferably the content of (B) is from 1 to 20% by weight and that of oil (A) is from 99% by weight to 80% by weight. More preferably the content of (B) is from 5 to 10% by weight and that of oil (A) is from 95% by weight to 90% by weight. In the present invention, in addition to the components (A) and (B), other components such as a thermal stabilizer may be contained in a small amount within the range where the objects of the present invention are not impaired.

The additive composition for lubricating oils according to the present invention is a composition which contains the component (A) in the above-described amount, so that, for example, by mixing this composition with other components for lubricating oil compositions in producing the lubricating oil compositions, a specific viscosity suitable for lubricating oils can be attained with a reduced amount of the component (B) added. That is, this composition is excellent in oil-thickening property. Further, by using said additive composition for lubricating oils, lubricating oil compositions excellent in low-temperature characteristics and handleability at low temperatures can be obtained. Since the additive composition for lubricating oils according to the present invention is a composition containing the oil (A), as described above, it has good workability at the time of addition and can be readily mixed with the other components.

[Lubricating Oil Compositions]

Lubricating oil compositions according to the present invention are compositions which comprise a lubricating oil base (AA), the above-mentioned copolymer (B), and a pour-point depressant (C).

At first, each component composing the lubricating oil compositions according to the present invention is explained.

<(AA) Lubricating Oil Base>

The lubricating oil base (AA) used in the present invention includes mineral oils and synthetic oils such as poly-α-olefin, polyol ester, diesters such as dioctyl phthalate and dioctyl sebacate, and polyalkylene glycol. Mineral oils or blends of mineral oils and synthetic oils are preferably used. Mineral oils subjected to a purification step such as dewaxing or the like are generally used, and have several grades designated in accordance with purification procedures. Generally mineral oils having a wax content of 0.5 to 10% are used. One may also use a highly purified oil which is produced, for example, by hydrocracking purification and has a low pour point, a high viscosity index, and a composition mainly composed of isopraffin. The oils having a kinematic viscosity at 40° C. of 10 to 200 cSt are generally used.

Mineral oils are generally used after a purification step such as dewaxing or the like as described above, and are classified into several grades which are defined by API (American Petroleum Institute) classification. The properties of lubricating oil bases classified into each of the groups were shown in above-described Table 1.

Poly-α-olefin in Table 1 is a hydrocarbon polymer obtained by polymerizing at least an α-olefin having 10 or more carbon atoms as a raw material monomer, as exemplified by polydecene obtained by polymerizing 1-decene.

The lubricating oil base (AA) used in the present invention is preferably the oil which belongs to any of groups (i) to (iv). Particularly, a mineral oil having a kinematic viscosity at 100° C. of 1 to 50 mm$^2$/s and a viscosity index of 80 or more, or poly-α-olefin is preferred. Further, as the lubricating oil base (AA), a mineral oil which belongs to group (ii) or group (iii), or poly-α-olefin which belongs to group (iv) is preferred. Oils of group (ii) and oils of group (iii) tend to have lower wax content as compared with oils of group (i). Particularly, the most preferable one is a mineral oil which belongs to group (ii) or group (iii) and has a kinematic viscosity at 100° C. of 1 to 50 mm$^2$/s and a viscosity index of 80 or more, or poly-α-olefin which belongs to group (iv).

<(B) Copolymer>

As the copolymer (B) used in the lubricating oil composition of the present invention, the copolymer (B) which is the above-described viscosity modifier for lubricating oils is used.

<(C) Pour-Point Depressant>

The pour-point depressant used in the lubricating oil composition of the present invention includes an alkylated naphthalene, a (co)polymer of alkyl methacrylate, a (co)polymer of alkyl acrylate, a copolymer of alkyl fumarate and vinyl acetate, an α-olefin polymer, a copolymer of an α-olefin and styrene, and the like. Of these, a (co)polymer of alkyl methacrylate and a (co)polymer of alkyl acrylate are preferably used.

The lubrication oil compositions according to the present invention comprise the pour-point depressant (C) as well as the lubricating oil base (AA) and the copolymer (B) which are described above. In this lubricating oil compositions, the copolymer (B) is contained in an amount of 0.1 to 5% by weight, preferably 0.2 to 1.5% by weight, more preferably 0.25 to 1.5% by weight, particularly preferably 0.30 to 1.5% by weight; the pour-point depressant (C) is contained in an amount of 0.05 to 5% by weight, preferably 0.1 to 3% by weight, more preferably 0.1 to 2% by weight, most preferably 0.2 to 1.5% by weight; and the remainders are lubricating oil base (AA) and blending components which are described later. Here, there are no particular limitations on the amounts of the blending components other than (B) and (C), but the upper limit of the ratio of (AA)/(blending components other than (B) and (C)) is 100/0, preferably 99/1, more preferably 97/3, still more preferably 95/5, wherein the total amount of lubricating oil base (AA) and the blending components other than (B) and (C) is 100% by weight. The lower limit of the ratio of (AA)/(blending components other than (B) and (C)), although it is not particularly limited, is preferably 60/40, more preferably 70/30, particularly preferably 85/15. The specific numerical range is, for example, 100/0 to 60/40, preferably 99/1 to 70/30, more preferably 97/3 to 80/20, still more preferably 95/5 to 85/15.

In the lubricating oil compositions of the present invention, the effect of increasing viscosity can be obtained when the content of the copolymer (B) is 0.1% by weight or more. When the copolymer (B) has composition distribution, a component which impairs the effect of the pour-point depressant (C) may be contained. However, when the content of the copolymer (B) is 5% by weight or less, the effect of the pour-point depressant (C) is not impaired, and thus such a content of the copolymer (B) is favorable. Therefore, when the content of the copolymer (B) is within the above-described range, the excellent effect of increasing viscosity is exerted, and lubricating oil compositions having good fluidity at low temperatures can be obtained.

For such lubricating oil compositions, the temperature dependence of viscosity is small, and elevation of pour point caused by the interaction between the copolymer (B) and the pour-point depressant (C) is reduced. These lubricating oil compositions are excellent in low-temperature characteristics in entire range of shear rate, handleability at low temperatures, and lubricating performance.

The lubricating oil compositions according to the present invention may contain, besides the lubricating oil base (AA), the copolymer (B), and the pour-point depressant (C), blending components having an effect of improving viscosity index such as a (co)polymer of alkyl methacrylate, hydrogenated SBR, and SEBS, or blending components such as detergents, rust preventives, dispersants, extreme-pressure additives, antifoaming agents, antioxidants, and metal deactivators.

The lubricating oil compositions according to the present invention can be prepared, using publicly known conventional methods, by mixing or dissolving the copolymer (B), the pour-point depressant (C), and, if necessary, the other blending components in the lubricating oil base (AA).

EXAMPLES

The present invention will be further described in detail with reference to the following examples, but it should be construed that the present invention is in no way limited to those examples.

In the examples, the physical properties are measured as described below.

<<Compositions of Copolymers>>

The composition was determined, using a nuclear magnetic resonance spectrometer LA500 manufactured by JEOL Ltd., in a mixed solvent of ortho-dichlorobenzene and benzene-$d_6$ (ortho-dichlorobenzene/benzene-$d_6$=3/1 to 4/1 (volume ratio)) at 120° C. in a pulse width of 45° for a pulse repetition time of 5.5 seconds.

<<Mw/Mn>>

The Mw/Mn was measured using GPC (gel permeation chromatography) in an ortho-dichlorobenzene solvent at 140° C.

<<Intrinsic Viscosity>>

The intrinsic viscosity was measured in decalin at 135° C.

<<Heat of Fusion>>

The heat of fusion was obtained from the area of endothermic peak of an endothermic curve which was measured by a differential scanning calorimeter (DSC); that is, a sample was packed in an aluminum pan, heated to 200° C. at a rate of 10° C./min, kept at 200° C. for 5 min, cooled to minus 150° C. at a rate of 20° C./min, and heated again at a rate of 10° C./min, and the endothermic curve recorded at the second run was used for determination.

<<Viscosity at 100° C. (K.V.)>>

The kinematic viscosity was measured based on ASTM D 445. In the present examples, the K.V. (kinematic viscosity) of each sample was regulated to be about 10 mm$^2$/sec.

<<Cold Cranking Simulator (CCS) Viscosity>>

The CCS viscosity was measured based on ASTM D 2602. The CCS viscosity was used for evaluation of sliding properties (starting properties) at low temperatures at a crank shaft. When the value of the CCS viscosity is smaller, the low-temperature characteristics of lubricating oil are better.

<<Mini-Rotary Viscometer (MR) Viscosity>>

The MR viscosity was measured based on ASTM D 4684. The MR viscosity was used for evaluation of pumping by an oil pump at low temperatures. When the value of the MR viscosity is smaller, the low-temperature characteristics of lubricating oil are better.

Polymerization Example 1

Synthesis of Olefin Copolymers

To a 1 L volume pressurized continuous polymerization reactor equipped with a stirring blade and thoroughly purged with nitrogen, 1 L of purified and dehydrated decane was introduced. Decane was fed continuously at a rate of 600 mL/h, and the pressure was increased so that the total pressure reached 3.8 MPa. After that, a decane solution of triisobutylaluminum (0.2 mmol/L) was fed continuously at a rate of 300 mL/h, and then a decane solution of triphenylcarbenium (tetrakispentafluorophenyl)borate (0.006 mmol/L) was fed continuously at a rate of 200 mL/h. Further, as a catalyst, a 0.0015 mmol/L decane solution of [dimethyl(t-butylamido)(tetramethyl-$\eta^5$-cyclopentadienyl)silane]titanium dichloride was fed continuously at a rate of 100 mL/h in such a manner that no vapor phase existed in the polymerization reactor. Meanwhile, from the top of the polymerization reactor, the polymerization solution was drawn out so that the volume of the polymerization solution in the polymerization reactor was constantly 1 L. Then, ethylene at a rate of 27 NL/h, propylene a rate of 0.4 L/h, octene a rate of 0.42 L/h, and hydrogen a rate of 0.3 NL/h were continuously fed to the polymerization reactor. Copolymerization was conducted at 80° C. by circulating coolant and steam through jackets equipped outside of the polymerization reactor.

By performing copolymerization under the above-described conditions, a polymerization solution containing an ethylene/propylene/octene copolymer was obtained. The resultant polymerization solution was poured into a large amount of methanol so as to deposit the ethylene/propylene/octane copolymer, which was then dried under reduced pressure at 130° C. for 24 hr. The properties of the resulting polymer are shown in Table 2.

Polymerization Example 2

Copolymerization was conducted in a similar manner to Polymerization Example 1 except that the flow rate of propylene was changed to 0.23 L/h, that the flow rate of octene was changed to 0.78 L/h, and that the flow rate of hydrogen was changed to 1.0 NL/h. The properties of the resulting polymer are shown in Table 2.

Polymerization Example 3

Copolymerization was conducted in a similar manner to Polymerization Example 1 except that the flow rate of propylene was changed to 0.35 L/h and that 1-butene was fed in place of octene at a flow rate of 0.4 L/h. The properties of the resulting polymer are shown in Table 2.

Polymerization Example 4

Copolymerization was conducted in a similar manner to Polymerization Example 1 except that the flow rate of propylene was changed to 0.38 L/h and that 1-hexene was fed in place of octene at a flow rate of 0.4 L/h. The properties of the resulting polymer are shown in Table 2.

Polymerization Example 5

To a 2 L volume stainless steel autoclave equipped with a stirring blade and thoroughly purged with nitrogen, 900 mL of heptane was introduced at 23° C. To this autoclave, 50 NL of propylene was introduced with rotating the stirring blade and ice-cooling. Then, the autoclave was heated to 60° C. and pressurized with ethylene so that the total pressure became 0.8 MPa. When the inner pressure of the autoclave reached 0.8 MPa, 1.0 mL of a 1.0 mmol/mL hexane solution of triisobutylaluminum was fed by nitrogen pressure. After that, 3 mL of a toluene solution containing 0.2 mmol (in terms of Al)

of methylaluminoxane, 0.002 mmol of bis(1,3-dimethylcyclopentadienyl)zirconium dichloride, which was pre-prepared, was fed into the autoclave by nitrogen pressure to start polymerization. Then, the inside temperature of the autoclave was regulated at 60° C. for 60 min, and ethylene was directly fed so that pressure became 0.8 MPa. After 60 min from the start of polymerization, 5 ml of methanol was pumped to the autoclave to terminate polymerization, and then the autoclave was depressurized to atmospheric pressure.

The resulting polymerization solution was poured into a large amount of methanol so as to deposit an ethylene/propylene copolymer, which was then dried under reduced pressure at 130° C. for 24 hr. The properties of the resulting polymer are shown in Table 2.

TABLE 2

| | Polymerization Example 1 | Polymerization Example 2 | Polymerization Example 3 | Polymerization Example 4 | Polymerization Example 5 |
|---|---|---|---|---|---|
| Polymer properties | | | | | |
| Ethylene content (mol %) | 46.1 | 46.2 | 48.1 | 46.8 | 47.8 |
| Propylene content (mol %) | 39.5 | 22.2 | 38.4 | 38.9 | 52.2 |
| Octene content (mol %) | 14.4 | 31.6 | — | — | — |
| Butene content (mol %) | — | — | 13.5 | — | — |
| Hexene content (mol %) | — | — | — | 14.3 | — |
| [η] (dl/g) | 1.68 | 1.58 | 1.76 | 1.59 | 1.56 |
| Sαβ/Sαα (%) | 0.16 | 0.16 | 0.16 | 0.16 | 0.16 |
| Mw/Mn | 1.9 | 2.0 | 1.8 | 2.0 | 2.1 |
| Heat of fusion (J/g) | 2.4 | 2.6 | 3.1 | 2.8 | 3.1 |

Polymerization Example 6

Synthesis of Olefin Copolymers

To a 1 L volume pressurized continuous polymerization reactor equipped with a stirring blade and thoroughly purged with nitrogen, 1 L of purified and dehydrated decane was introduced. Decane was fed continuously at a rate of 600 mL/h, and the pressure was increased so that the total pressure reached 3.8 MPa. After that, a decane solution of triisobutylaluminum (TIBA) (0.2 mmol/L) was fed continuously at a rate of 300 mL/h, then a decane solution of triphenylcarbenium(tetrakispentafluorophenyl)borate (0.006 mmol/L) was fed continuously at a rate of 200 mL/h. Further, as a catalyst, a 0.0015 mmol/L decane solution of [dimethyl(t-butylamido)(tetramethyl-η$^5$-cyclopentadienyl)silane]titanium dichloride was fed continuously at a rate of 100 mL/h so that no vapor phase existed in the polymerization reactor. Meanwhile, from the top of the polymerization reactor, the resulting polymerization solution was continuously drawn out so that the volume of the polymerization solution in the polymerization reactor was constantly 1 L. Then, ethylene at a rate of 27 NL/h, propylene at a rate of 0.6 L/h, octene at a rate of 0.42 L/h, and hydrogen at a rate of 0.3 NL/h were continuously fed to the polymerization reactor. Copolymerization was conducted at 80° C. by circulating coolant and steam through jackets equipped outside of the polymerization reactor.

By performing copolymerization under the above conditions, a polymerization solution containing an ethylene/propylene/octane copolymer was obtained. The resulting polymerization solution was poured into a large amount of methanol to deposit the ethylene/propylene/octene copolymer, which was then dried under reduced pressure at 130° C. for 24 hr. The properties of the resulting polymer are shown in Table 3.

Polymerization Example 7

Copolymerization was conducted in a similar manner to Polymerization Example 1 except that the flow rate of propylene was changed to 0.21 L/h. The properties of the resulting polymer are shown in Table 3.

TABLE 3

| Polymer properties | Polymerization Example 6 | Polymerization Example 7 |
|---|---|---|
| Ethylene content (mol %) | 35.6 | 60.2 |
| Propylene content (mol %) | 64.0 | 25.5 |
| Octene content (mol %) | 14.8 | 14.3 |
| Butene content (mol %) | — | — |
| Hexene content (mol %) | — | — |
| [η] (dl/g) | 1.56 | 1.78 |
| Sαβ/Sαα (%) | 0.16 | 0.16 |
| Mw/Mn | 2.0 | 1.9 |
| Heat of fusion (J/g) | 1.2 | 8.2 |

Example 1

Using 87.18% by weight of a mineral oil "120 Neutral" (Trade name, manufactured by ESSO Co., Ltd.), which was classified in the group (ii) in Table 1, having a kinematic viscosity at 100° C. of 4.60 mm$^2$/s, as a lubricating oil base, 0.82% by weight of a polymer prepared in Polymerization Example 1 as a viscosity index improver, 0.6% by weight of "ACLUBE 146" (Trade name, manufactured by Sanyo Chemical Industries Ltd.) as a pour-point depressant, and 11.4% by weight of "LZ20003C" (Trade name, manufactured by The Lubrizol Corporation) as a detergent-dispersant, a lubricating oil composition was prepared and its properties were evaluated. The results are shown in Table 4.

Examples 2 to 4 and Comparative Example 1

The procedure of Example 1 was repeated except that the polymers each prepared in Polymerization Examples 2 to 5 were used respectively as a viscosity index improver to evaluate the lubricating oil composition as shown in Table 4. The results are shown in Table 4.

TABLE 4

|  | Example 1 | Example 2 | Example 3 | Example 4 | Comparative Example 1 |
|---|---|---|---|---|---|
| Polymer blended | Polymerization Example 1 | Polymerization Example 2 | Polymerization Example 3 | Polymerization Example 4 | Polymerization Example 5 |
| Composition (% by weight) | | | | | |
| Lubricating oil base | 87.18 | 87.28 | 87.31 | 87.22 | 88.77 |
| Detergent-dispersant | 11.4 | 11.4 | 11.4 | 11.4 | 10.0 |
| Pour-point depressant | 0.6 | 0.6 | 0.6 | 0.6 | 0.5 |
| Polymer | 0.82 | 0.72 | 0.69 | 0.77 | 0.73 |
| Properties of lubricating oil | | | | | |
| Kinematic viscosity at 100° C. (mm$^2$/s) | 10.94 | 10.89 | 11.02 | 10.98 | 10.24 |
| CCS viscosity at −30° C. (mPa · s) | 5904 | 5764 | 5922 | 5822 | 6140 |
| MR viscosity at −35° C. (mPa · s) | 28274 | 27765 | 29811 | 28910 | 40000 |

As is clearly shown in Table 4, the composition in which a specific copolymer of ethylene, propylene and a higher α-olefin having 4 to 20 carbon atoms is used as a viscosity modifier for lubricating oils is better in low-temperature characteristics such as CCS viscosity and MR viscosity as compared with the composition in which a copolymer of ethylene and propylene is used as a viscosity modifier for lubricating oils.

For lubricating oil compositions, low-temperature characteristics such as CCS viscosity and MR viscosity are desired to be improved as much as possible. For example, by increasing the degree of purification of lubricating oil base, CCS viscosity can be lowered, for example, by around 10 in the above measurement value, or MR viscosity can be lowered, for example, by around 100 in the above measurement value (that is, the low-temperature properties are improved), but it takes cost.

As opposed to the above case, according to the present invention, the CCS viscosity and MR viscosity can be improved without using any expensive methods. This is of great significance.

Comparative Examples 2 and 3

The procedure of Example 1 was repeated except that the polymers each prepared in Polymerization Examples 6 and 7 were used respectively as a viscosity index improver to evaluate the lubricating oil composition as shown in Table 5. The results are shown in Table 5.

TABLE 5

| Polymer blended | Comparative Example 2 Polymerization Example 6 | Comparative Example 3 Polymerization Example 7 |
|---|---|---|
| Composition (% by weight) | | |
| Lubricating oil base | 87.12 | 87.31 |
| Detergent-dispersant | 11.4 | 11.4 |

TABLE 5-continued

| Polymer blended | Comparative Example 2 Polymerization Example 6 | Comparative Example 3 Polymerization Example 7 |
|---|---|---|
| Pour-point depressant | 0.6 | 0.6 |
| Polymer | 0.88 | 0.69 |
| Properties of lubricating oils | | |
| Kinematic viscosity at 100° C. (mm$^2$/s) | 10.94 | 10.89 |
| CCS viscosity at −30° C. (mPa · s) | 6410 | 5654 |
| MR viscosity at −35° C. (mPa · s) | 29931 | 48869 |

The invention claimed is:

1. A viscosity modifier for lubricating oils comprising an ethylene/α-olefin copolymer (B) which comprises:
   (i) a structural unit derived from ethylene;
   (ii) a structural unit derived from an α-olefin having 3 to 19 carbon atoms; and
   (iii) a structural unit derived from a higher α-olefin having 4 to 20 carbon atoms whose carbon number is by one or more larger than that of the structural unit derived from an α-olefin having 3 to 19 carbon atoms, and has the following properties of (1), (2), and (4):

(1) it contains 25 to 46.2 mol % of the structural unit (i) derived from ethylene, 15 to 55 mol % of the structural unit (ii) derived from an α-olefin having 3 to 19 carbon atoms, and 9 to 40 mol % of the structural unit (iii) derived from a higher α-olefin having 4 to 20 carbon atoms, wherein the total molar amount of the structural units (i), (ii), and (iii) is 100 mol %;

(2) the intrinsic viscosity ([η]) is in the range of 1.5 to 5.0 dl/g as measured in decalin at 135° C.;

(4) the heat of fusion (ΔH) as measured by DSC is 5.0 J/g or less.

2. The viscosity modifier for lubricating oils according to claim 1, wherein the ethylene/α-olefin copolymer (B) has the following property of (3):

(3) Mw/Mn is 2.4 or less, where Mw is weight average molecular weight and Mn is number average molecular weight.

3. The viscosity modifier for lubricating oils according to claim 1, wherein the ethylene/α-olefin copolymer (B) has the following property of (5):

(5) the intensity ratio D is 0.5 or less, where D is the ratio of Sαβ to Sαα (Sαβ/Sαα) as measured by $^{13}$C-NMR.

4. An additive composition for lubricating oils which comprises (A) oil and (B) the ethylene/α-olefin copolymer according to claim 1, and contains said ethylene/α-olefin copolymer (B) in a ratio of 1 to 30% by weight, wherein the total amount of (A) and (B) is 100% by weight.

5. A lubricating oil composition comprising:

(AA) a lubricating oil base, (B) the ethylene/α-olefin copolymer according to claim 1, and (C) a pour-point depressant and contains said ethylene/α-olefin copolymer (B) in a ratio of 0.1 to 5% by weight and the pour-point depressant (C) in a ratio of 0.05 to 5% by weight, wherein the weight of said lubricating oil composition is 100% by weight.

* * * * *